(12) United States Patent
Wagner et al.

(10) Patent No.: US 12,634,153 B2
(45) Date of Patent: May 19, 2026

(54) INTEGRATING IDENTITY TOKENS AND PRIVACY-PRESERVING IDENTITY ATTRIBUTE ATTEST

(71) Applicant: Visa International Service Association, San Francisco, CA (US)

(72) Inventors: Kim Wagner, Sunnyvale, CA (US); Brian Sullivan, Amersham (GB); Dinah Sloan, San Jose, CA (US); Hao Ngo, San Jose, CA (US); Gaven James Watson, Palo Alto, CA (US); Sunpreet Singh Arora, San Jose, CA (US); Saikrishna Badrinarayanan, Fremont, CA (US); Srinivasan Raghuraman, Cambridge, MA (US)

(73) Assignee: Visa International Service Association, San Francisco, CA (US)

( * ) Notice: Subject to any disclaimer, the term of this patent is extended or adjusted under 35 U.S.C. 154(b) by 181 days.

(21) Appl. No.: 18/654,327

(22) Filed: May 3, 2024

(65) Prior Publication Data

US 2024/0283659 A1    Aug. 22, 2024

Related U.S. Application Data

(62) Division of application No. 18/044,544, filed as application No. PCT/US2021/059717 on Nov. 17, 2021, now Pat. No. 12,015,720.

(Continued)

(51) Int. Cl.
*H04L 9/32* (2006.01)
*H04L 9/30* (2006.01)

(52) U.S. Cl.
CPC .......... *H04L 9/3255* (2013.01); *H04L 9/3066* (2013.01); *H04L 9/3218* (2013.01)

(58) Field of Classification Search
None
See application file for complete search history.

(56) References Cited

U.S. PATENT DOCUMENTS

| | | | |
|---|---|---|---|
| 2011/0161176 A1 | 6/2011 | Ai | |
| 2014/0173754 A1 | 6/2014 | Barbir | |

(Continued)

FOREIGN PATENT DOCUMENTS

| | | | |
|---|---|---|---|
| CN | 106888097 A | 6/2017 | |
| EP | 2023528 A1 | 2/2009 | |

(Continued)

OTHER PUBLICATIONS

Morais; Eduardo et al. "Zero Knowledge Set Membership" [online] ING, Oct. 15, 2018 [retrieved Nov. 26, 2025]. Retrieved from the Internet: URL: https://www.ing.com/Newsroom/News.htm (Year: 2018).*

(Continued)

*Primary Examiner* — Taghi T Arani
*Assistant Examiner* — Joshua Raymond White
(74) *Attorney, Agent, or Firm* — Kilpatrick Townsend & Stockton LLP

(57) ABSTRACT

A method is disclosed. The method comprises receiving, by a user device from an identity network computer, a query set comprising a plurality of test identity attributes; encrypting, by the user device, the query set to form an obscured query set; computing, by the user device, a zero-knowledge proof using the obscured query set and an encrypted identity attribute associated with a user operating the user device; and transmitting, by the user device to the identity network computer, the obscured query set and the zero-knowledge proof, wherein the identity network computer verifies the zero-knowledge proof, retrieves an encrypted identity attribute associated with the user, evaluates the obscured query (Continued)

set with respect to the encrypted identity attribute, and transmits a result of the evaluation to a relying party computer.

19 Claims, 8 Drawing Sheets

Related U.S. Application Data

(60) Provisional application No. 63/241,495, filed on Sep. 7, 2021, provisional application No. 63/115,475, filed on Nov. 18, 2020.

(56) References Cited

U.S. PATENT DOCUMENTS

| | | | |
|---|---|---|---|
| 2014/0245006 A1 | 8/2014 | Papamanthou et al. | |
| 2015/0113290 A1 | 4/2015 | Auradkar et al. | |
| 2016/0269416 A1* | 9/2016 | Camenisch | H04L 63/126 |
| 2020/0374132 A1 | 11/2020 | Lobban et al. | |

FOREIGN PATENT DOCUMENTS

| | | |
|---|---|---|
| KR | 20170019308 A | 2/2017 |
| WO | 2008020991 A2 | 2/2008 |

OTHER PUBLICATIONS

Slamanig; Daniel et al. "Adding Controllable Linkability to Pairing-Based Group Signatures for Free" [online] IACR, Jan. 2014 [retrieved Nov. 26, 2025]. Retrieved from the Internet: URL: https://eprint.iacr.org/2014/607.pdf (Year: 2014).*

Zeng; Ming et al. "Public key encryption with equality test via hash proof system" [online] ScienceDirect, Jul. 2, 2019 [retrieved Nov. 26, 2025]. Retrieved from the Internet: URL: https://www.sciencedirect.com/science/article/pii/S0304397519303822 (Year: 2019).*

Belenkiy; Mira "U-Prove Set Membership Proof Extension" [online] Microsoft, Jun. 1, 2014 [retrieved Nov. 26, 2025]. Retrieved from the Internet: URL: https://www.microsoft.com/en-us/research/wp-content/uploads/2016/02/U-Prove20Set20Membership20Proof20Extension.pdf (Year: 2014).*

Guajardo; Jorge et al. "Anonymous Credential Schemes with Encrypted Attributes" [online] Radboud Universiteit, 2010 [retrieved Nov. 26, 2025]. Retrieved from the Internet: URL: https://www.cs.ru.nl/~bmennink/pubs/10cans.pdf (Year: 2010).*

Moreno; Rafael et al. "The Olympus Architecture—Oblivious Identity Management for Private User-Friendly Services" [online] MDPI, Feb. 10, 2020 [retrieved Nov. 26, 2025]. Retrieved from the Internet: URL: https://www.mdpi.com/1424-8220/20/3/945 (Year: 2020).*

Blazy; Olivier et al. "Non-Interactive Plaintext (In-)Equality Proofs and Group Signatures with Verifiable Controllable Linkability" [online] Hal, Mar. 23, 2016 [retrieved Nov. 26, 2025]. Retrieved from the Internet: URL: https://hal.science/hal-01292705v1/file/082.pdf (Year: 2016).*

U.S. Appl. No. 18/044,544, "Non-Final Office Action", Oct. 24, 2023, 26 pages.

U.S. Appl. No. 18/044,544, "Notice of Allowance", Feb. 12, 2024, 12 pages.

Camenisch et al., "Signature Schemes and Anonymous Credentials from Bilinear Maps", Electronic Publishing, Artistic Imaging, and Digital Typography, vol. 3152, 2004, pp. 56-72.

Dingle, "Advancing Privacy with Zero-Knowledge Proof Credentials", Available online at: https://techcommunity.microsoft.com/t5/identity-standards-blog/advancing-privacy-with-zero-knowledge-proof-credentials/ba-p/1441554, Jul. 22, 2020, 9 pages.

EP21895503.7, "Extended European Search Report", Apr. 16, 2024, 6 pages.

Gudymenko, "A Privacy-Preserving E-Ticketing System for Public Transportation Supporting Fine-Granular Billing and Local Validation", Proceedings of the 7th International Conference on Security of Information and Networks, Sep. 9, 2014, pp. 101-108.

Han et al., "Privacy-Preserving Electronic Ticket Scheme with Attribute-based Credentials", IEEE Transactions on Dependable and Secure Computing, vol. 18, No. 4, Jun. 26, 2018, 18 pages.

Liu, "Privacy-Preserving Multi-Keyword Searchable Encryption for Distributed Systems", Institute of Electrical and Electronics Engineers Transactions on Parallel and Distributed Systems, vol. 32, No. 3, Mar. 2021, pp. 561-574.

Ma et al., "Public Key Encryption with Delegated Equality Test in a Multi-User Setting", The Computer Journal, vol. 58, No. 4, Apr. 4, 2014, pp. 986-1002.

Oleynikov et al., "Where are you Bob? Privacy-Preserving Proximity Testing with a Napping Party", Available Online at: https://eprint.iacr.org/2020/857.pdf, 2020, 26 pages.

PCT/US2021/059717, "International Preliminary Report on Patentability", Jun. 1, 2023, 6 pages.

PCT/US2021/059717, "International Search Report and Written Opinion", Mar. 4, 2022, 9 pages.

Schneier, "Applied Cryptography, Second Edition: Protocols, Algorthms, and Source Code in C (cloth)", John Wiley & Sons, 2nd edition, Available online at https://mrajacse.files.wordpress.com/2012/01/applied-cryptography-2nd-ed-b-schneier.pdf, 1996, 1027 pages.

Slamanig et al., "Adding Controllable Linkability to Pairing-Based Group Signatures for Free", Institute for Applied Information Processing and Communications, Available Online at: https://eprint.iacr.org/2014/607.pdf, 2014, pp. 1-20.

Sun et al., "Mobile Access and Flexible Search Over Encrypted Cloud Data in Heterogeneous Systems", Information Sciences, vol. 507, Jan. 2020, pp. 1-15.

Zhang et al., "Privacy Preserving Ranked Multi-Keyword Search for Multiple Data Owners in Cloud Computing", Institute of Electrical and Electronics Engineers Transactions on Computers, vol. 65, No. 5, 2016, pp. 1566-1577.

\* cited by examiner

INTEGRATING IDENTITY TOKENS AND PRIVACY-PRESERVING IDENTITY ATTRIBUTE ATTEST

CROSS-REFERENCES TO RELATED APPLICATIONS

This application is a divisional application of U.S. patent application Ser. No. 18/044,544 filed on Mar. 8, 2023, which is a National Stage of International Application No. PCT/ US2021/059717 filed on Nov. 17, 2021, which claims priority to and benefit U.S. Patent Provisional Application No. 63/115,475, filed on Nov. 18, 2020 and U.S. Patent Provisional Application No. 63/241,495 filed on Sep. 7, 2021, which are incorporated herein by reference in their entirety for all purposes.

BACKGROUND

Interactions between a relying party and a user may require the user to provide identity data to the relying party. The relying party may need to make a decision as to whether to provide access to a resource to a user based on the identity data of the user. If the identity data is in plaintext, then the plaintext identity data that is in transit or at the relying party may be susceptible to skimming or hacking. Further, even the relying party's query as to whether the user's identity data satisfies a condition may undesirably reveal information about the user.

Embodiments of the disclosure address this problem and other problems individually and collectively.

SUMMARY

One embodiment of the invention includes a method. The method comprises: receiving, by a user device from an identity network computer, a query set comprising a plurality of test identity attributes; encrypting, by the user device, the query set to form an obscured query set; computing, by the user device, a zero-knowledge proof using the obscured query set and an encrypted identity attribute associated with a user operating the user device; and transmitting, by the user device to the identity network computer, the obscured query set and the zero-knowledge proof, wherein the identity network computer verifies the zero-knowledge proof, retrieves an encrypted identity attribute associated with the user, evaluates the obscured query set with respect to the encrypted identity attribute, and transmits a result of the evaluation to a relying party computer.

Another embodiment is related to a user device comprising: a processor; and a non-transitory computer readable medium comprising instructions executable by the processor to perform operations including: receiving, from an identity network computer, a query set comprising a plurality of test identity attributes; encrypting the query set to form an obscured query set; computing, a zero-knowledge proof using the obscured query set and an encrypted identity attribute associated with a user operating the user device; and transmitting, to the identity network computer, the obscured query set and the zero-knowledge proof, wherein the identity network computer verifies the zero-knowledge proof, retrieves an encrypted identity attribute associated with the user, evaluates the obscured query set with respect to the encrypted identity attribute, and transmits a result of the evaluation to a relying party computer.

Yet another embodiment includes a method. The method comprises: receiving, by an identity network computer from a relying party computer, an identity attribute request comprising a query set and a user identifier; determining, by the identity network computer, an account associated with the user identifier; transmitting, by the identity network computer, the query set to the user device; receiving, by the identity network computer from the user device, an obscured query set and a zero-knowledge proof; retrieving, by the identity network computer, an encrypted identity attribute associated with the user; verifying, by the identity network computer, the zero-knowledge proof; evaluating, by the identity network computer, the obscured query set with respect to the encrypted identity attribute; and transmitting, by the identity network computer to the relying party computer, a result of the evaluation.

A better understanding of the nature and advantages of embodiments of the invention may be gained with reference to the following detailed description and accompanying drawings.

DETAILED DESCRIPTION

Figure 1:
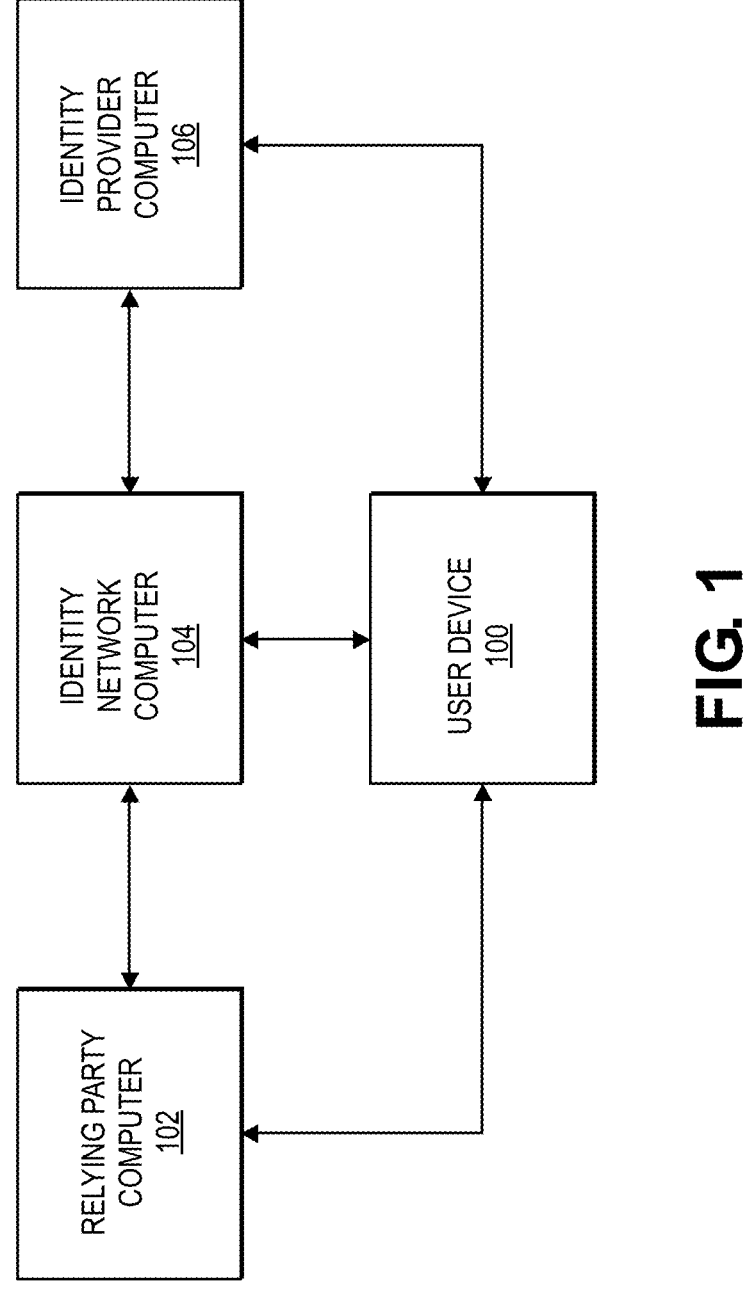
FIG. 1 shows a block diagram of an identity token interaction system.

Prior to discussing embodiments of the disclosure, some terms can be described in further detail.

A "user" may include an individual. In some embodiments, a user may be associated with one or more personal accounts and/or user devices. The user may also be referred to as a cardholder, account holder, or consumer in some embodiments.

A "user device" may be a device that is operated by a user. Examples of user devices may include a mobile device such as a mobile phone, a smart phone, a card, a personal digital assistant (PDA), a laptop computer, a desktop computer, a server computer, a thin-client device, a tablet PC, etc. Additionally, user devices may be any type of wearable technology device, such as a watch, earpiece, glasses, etc. The user device may include one or more processors capable of processing user input. The user device may also include one or more input sensors for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. The user device may comprise any electronic device that may be operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network.

An "application" may be a computer program that is used for a specific purpose. Examples of applications may include secure data access applications, banking applications, digital wallet applications, event ticketing applications, loyalty rewards applications, etc.

An "authorizing entity" may be an entity that authorizes a request. Examples of an authorizing entity may be an issuer, a governmental agency, a document repository, an access administrator, etc. An "issuer" may typically refer to a business entity (e.g., a bank) that maintains an account for a user. An issuer may also issue payment credentials stored on a user device, such as a cellular telephone, smart card, tablet, or laptop to the consumer.

A "resource provider" may be an entity that can provide a resource such as goods, services, information, and/or access. Examples of resource providers includes merchants, data providers, transit agencies, governmental entities, venue and dwelling operators, etc. A "merchant" may typically be an entity that engages in transactions and can sell goods or services, or provide access to goods or services.

An "access device" may be any suitable device that provides access to a remote system and/or a resource. An access device may also be used for communicating with a merchant computer, a transaction processing computer, an authentication computer, or any other computer. An access device may generally be located in any suitable location, such as at the location of a merchant. An access device may be in any suitable form. Some examples of access devices include POS or point of sale devices (e.g., POS terminals), cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from user device or a mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device.

An "interaction" may include a reciprocal action or influence. An interaction can include a communication, contact, or exchange between parties, devices, and/or entities. Example interactions include a transaction between two parties and a data exchange between two devices. In some embodiments, an interaction can include a user requesting access to secure data (e.g., a secure data interaction), a secure webpage (e.g., a secure webpage interaction), a secure location (e.g., a secure location interaction), and the like. In other embodiments, an interaction can include a payment transaction in which two devices can interact to facilitate a payment.

A "trapdoor" may be a function that is easy to compute in one direction, yet difficult to compute in the opposite direction. In mathematical terms, if f is a trapdoor function, then there exists some secret information td, such that given f(x) and td, it is easy to compute x.

An "assertion" may include a secure fact about an entity. For example, an assertion may specify something about an entity, such as whether the entity has the attributes required to rent a car. For example, an assertion about the entity in this context may be "this user is over 25 years old." An assertion may be based on and may obscure one or more identity attributes, or pieces of information about the entity. An assertion may be secured cryptographically. An assertion may be digitally signed by the entity of interest and/or the trusted party providing the secure facts.

An "attribute" can be or feature a quality or feature regarded as a characteristic or inherent part of someone or something. For example, three attributes associated with a user may be the name of the user, the birthday or the user, and an account number of the user.

A "identity token" can be a collection of data that can contain one or more attributes, and that can serve to identify or characterize a user. In some embodiments, an identity token includes a plurality of attributes. For example, an identity token for a user may comprise the name of the user, the birthday or the user, and an account number of the user. In some embodiments, an identity token may contain the same attribute multiple times. This can be the case if different identity providers provide the same attribute for the identity token. In this regard, an identity token may include a number of "sub identity tokens" (also referred to as "subtokens"). Each subtoken can be associated with a different identity provider.

A "key" or "cryptographic key" can include a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

A "key pair" may include a pair of linked cryptographic keys. For example, a key pair can include a public key and a corresponding private key (which may also be referred to as a secret key). In a key pair, a first key (e.g., a public key) may be used to encrypt a message, while a second key (e.g., a private key) may be used to decrypt the encrypted message. Additionally, a public key may be able to verify a digital signature created with the corresponding private key. The public key may be distributed throughout a network in order to allow for verification of messages signed using the corresponding private key. Public keys and private keys may be in any suitable format, including those based on RSA or elliptic curve cryptography (ECC). In some embodiments, a key pair may be generated using an asymmetric key pair algorithm.

A "digital signature" can include an electronic signature for a message or some data. A digital signature may be a numeric data value, an alphanumeric data value, or any other type of data including a graphical representation. A digital signature may be a unique data value generated from a message and/or data and a private key using an encrypting algorithm. In some embodiments, a validation algorithm employing a public key may be used to verify the signature.

A "zero-knowledge proof" can include a value indicating evidence establishing a fact or the truth of a statement. A zero-knowledge proof can indicate evidence of establishing a fact without disclosing the fact itself. For example, a zero-knowledge proof can include a value indicating evidence of an account balance without disclosing the account balance itself. A zero-knowledge proof can satisfy a completeness property, a soundness property, and a zero-knowledge property. As per the zero-knowledge property, if the zero-knowledge proof is true, then no verifier learns anything other than the fact that the statement is true.

A zero-knowledge proof can be an interactive zero-knowledge proof or a non-interactive zero-knowledge proof. An interactive zero-knowledge proof occurs when a prover must perform an action or series of actions to convince a specific verifier of something. A non-interactive zero-knowledge proof can occur when a provider provides a proof to anyone, where the proof can be verified by anyone that can access the information and attempts to verify the proof. Two example non-interactive zero-knowledge proofs include Zk-SNARK (zero-knowledge succinct non-interactive arguments of knowledge and Zk-STARK (zero-knowledge scalable transparent arguments of knowledge).

A "relying party" may refer to an entity that may receive identity data in some form (e.g., obscured) and may rely on it to perform some action. For example, a relying party may be a bar that wishes to determine if a user is over twenty-one years old, before the relying party provides alcohol to the user. Other examples of relying parties may include, but are not limited to, merchants, government agencies, transit operators, educational institutions, etc.

In some described systems, a transaction between a user and a relying party (e.g., a merchant) may require the user to prove to the relying party the truth of some predicate (e.g., an inequality predicate (i.e., an expression of one or more variables defined on some specific domain) to determine the user is above 21, a set membership prediciate to determine the user's home address is included in the set, etc.). The predicate may concern one or more of the user's identity attribute data (e.g., the user's date of birth, the user's home address or zip code, etc.). The user may compute, using a user device, a non-interactive zero knowledge (NIZK) proof over plaintext identity attribute data. The NIZK proof may then be sent to an identity network computer which verifies the NIZK proof, and subsequently informs the relying party of the result.

In the above example, the calculation of the NIZK proof is performed using plaintext identity attribute data. The plaintext identity attribute data could be at risk in a potential hacking attack, which is undesirable.

In embodiments of the invention, the user may store identity tokens with an identity network in an encrypted form. The identity network may generate non-interactive zero knowledge (NIZK) proofs for the truth of predicates (e.g., "is the user above 21 years of age?") by using the encrypted identity tokens. The identity network would not be able to determine the user's identity tokens, when the user's identity tokens are used to perform transactions such as access transactions or payment transactions.

FIG. 1 shows a block diagram of an identity token interaction system. The identity token interaction system may comprise a user device 100 operated by a user (not shown), a relying party computer 102 operated by a relying party (e.g., a resource provider not shown), an identity network computer 104, and an identity provider computer 106. The identity network computer 104 may be operated by a processing network. The identity provider computer 106 may be operated by an identity provider (e.g., an authorizing entity such as the DMV, an educational institute, a library, etc.), that knows identity attribute data of the user. For example, if the identity provider is the DMV, the identity provider may know the age of the user, the government issued identification number, home address of the user, etc.

The components in the system of FIG. 1 and any of the following figures can be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices may be transmitted using a secure communications protocols such as, but not limited to, File Transfer Protocol (FTP); Hyper-Text Transfer Protocol (HTTP); and Secure Hypertext Transfer Protocol (HTTPS).

The user device 100 may communicate with the identity provider computer 106 to obtain an identity token from the identity provider computer 106. The identity provider computer 106 may generate an identity token which comprises identity attribute data of the user operating the user device 100, and encrypt the identity token. For example, the identity token may comprise a list of data comprising a birthday of the user of the user device 100, a home location of the user device 100, and a type of payment device possessed by the user of the user device 100. This list of data can be in the identity token and can be encrypted. The encrypted identity token may then be transmitted to the identity network computer 104.

At a later point in time, the user device 100 may later interact with the relying party computer 102. The relying party computer 102 may verify some of the user's identity attribute data to complete the interaction. For example, if the interaction between the relying party and the user is a transaction for restricted goods such as alchohol, the relying party may verify the user's age is above the minimum legal drinking age. The relying party computer 102 may complete the verification by means of either an inequality predicate (e.g., user's age ≥21?) or a set membership predicate (e.g., is user's age contained in the set {21, 22, 23, 24, . . . }).

To encrypt the identity token, a Public Key Encryption with Equality Tests scheme (PKEETs) may be used. PKEETs are public-key encryption schemes that also support a trapdoor that allows tests for the equality of two plaintexts that correspond to two ciphertexts, without knowing either of the two plaintexts. One example construction of a PKEET can be formed by transforming a standard El-Gamal PKE (public key encryption) (used in FIG. 3 and FIG. 4) into a PKEET, as shown in Daniel Slamanig, et. al., "Adding controllable linkability to pairing based group signatures for free," Information Security—17th Internation Conference, ISC 2014, Hong Kong, China, Oct. 12-14, 2014. Proceedings, volume 8783 of Lecture Notes in Computer Science, pp. 388-400, Springer, 2014. In an El-Gamal PKE, the Decisional Diffie-Hellman assumption is assumed to hold in a group $\mathbb{G}_1$. The public parameters of the scheme may include a group description, a random generator $g_1$ (an element of large order suffices) and a random group element $$h_1 = g_1^x,$$

where the secret key (e.g., decryption key) of the scheme is x.

To turn the El-Gamal PKE sheme into a PKEET scheme, the group $\mathbb{G}_1$ may support a bilinear pairing e: $\mathbb{G}_1 \times \mathbb{G}_2 \rightarrow \mathbb{G}_3$, for some groups $\mathbb{G}_2$ and $\mathbb{G}_3$. A trapdoor td may be designed as follows. A group element $g_2 \leftarrow \mathbb{G}_2$ may be sampled, and the trapdoor may be computed as followes $$td = (g_2, h_2 = g_2^x) \in \mathbb{G}_2^2.$$

An equality test may be thereafter be performed. Consider two ciphertexts $ct_1$ and $ct_2$.

$$\text{Let } ct_1 = (T_1, U_1) = M(g_1^r, h_1^r g_1^{m-1}) \text{ and } ct_2 = (T_2, U_2) = (g_2^r, h_2^r g_2^{m-2}),$$

where "r" can be a random number. (Note that in this application, an underscore symbol preceding a number or variable may indicate that it is a subscript). The test for equality of $m_1$ and $m_2$, which requires four pairings and two multiplications, is formed by the equation:

$$e(U_1, g_2) \cdot e(T_1, h_2)^{-1} \overset{?}{=} e(U_2, g_2) \cdot e(T_2, h_2)^{-1}$$

Several other constructions with varying efficiencies and in varying models such as the random oracle model, standard model, etc., including black-box constructions, PKEETs extended to support stronger notions of security such as CCA1, CCA2, etc., and broader settings like the identity-based setting, hierarchical setting, etc., can be found in Hyung Tae Lee, et. al., "Public key encryption with equality test in the standard model," Information Sciences Vol. 516, pp. 89-108, and the several works referenced therein.

Figure 2:
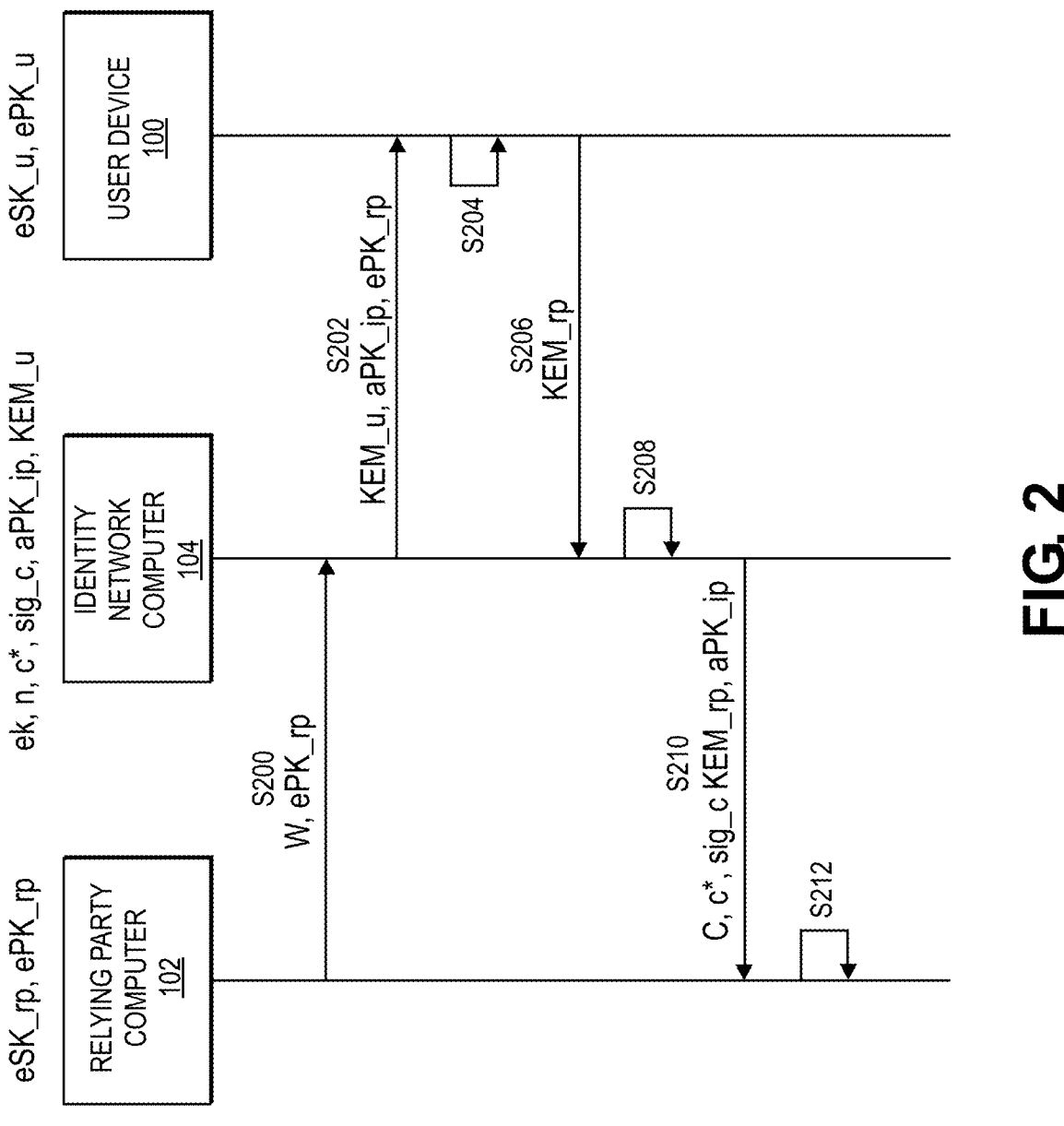
FIG. 2 shows a flow diagram of a relying party computer requesting attestations of a user from an identity network computer.

Prior to the flow described in FIG. 2, the user device 100 may populate an identity token by interacting with the identity network computer 104, and the identity provider computer 106. The identity network computer 104 may select groups of elements $G_1$, $G_2$, and $G_3$, which support a pairing operating e such that $G_1 \times G_2 \rightarrow G_3$. $G_1$ and $G_2$ may have generators $g_1$ and $g_2$ respectively. The generators $g_1$ and $g_2$ may be public parameters, and be used as input by all parties in all of the following algorithms and in FIG. 2. The user device 100 may generate a user key pair ($ePK_u$, $eSK_u$) (e.g., a user public key, $ePK_u$, and a user private key, $eSK_u$). The relying party computer 102 may also generate a relying party key pair ($ePK_{rp}$, $eSK_{rp}$) (e.g., a relying party public key, $ePK_{rp}$, and a relying party private key, $eSK_{rp}$). The identity provider computer may generate an identity provider signing key pair for the user ($aPK_{ip}$, $aSK_{ip}$) (e.g., an identity provider public key, $aPK_{ip}$, and an identity provider signing key, $aSK_{ip}$), and transmit the public key, $aPK_{ip}$, to the identity network computer 104. The user key pair ($ePK_u$, $eSK_u$), relying party key pair ($ePK_{rp}$, $eSK_{rp}$), and the identity provider signing key pair ($aPK_{ip}$, $aSK_{ip}$) may be generated using cryptographic algorithms such as Rivest-Shamir-Adleman (RSA) or Elliptic Curve Digital Signature Algorithm (ECDSA). After generating the identity provider key pair, the identity provider computer may then begin to populate an identity token.

In a first step, the identity provider computer 106 may sample a first random value x.

In a second step, after generating the first random value, x, the identity provider computer 106 may use the first random value, x, to generate an ephemeral public key, $ek=g_1^x$, a secret key, $dk=x$, and a trapdoor, $td=g_2^x$, for the user device 100.

The method described with respect to FIG. 2 assumes that the equality check is performed while the attributes are encrypted (e.g., an encrypted stored attribute is equal to an encrypted candidate attribute). However, in some cases, the secret key, dk, may be used if the full plaintext identity attributes of the user are required. To use the secret key, dk, the method described in FIG. 2 can combined with a secure data exchange process so that the plaintext identity attributes may be securely transmitted.

In a third step, the identity provider computer 106 may then sign the trapdoor using the identity provider signing key, $aSK_{ip}$, (e.g., using a signing function of the RSA/ECDSA algorithm used to generate the identity provider key pair) to form a signed trapdoor, sig_td=RSA/ECDSA.Sign ($aSK_{id}$, td).

In a fourth step, after signing the trapdoor, the identity provider computer 106 may encrypt the trapdoor, td, along with the signed trapdoor, sig_td, using the user public key $ePK_u$ to form an encrypted trapdoor, $KEM_u$=RSA.ENC ($ePK_u$, (td, sig_td)).

In a fifth step, the identity provider computer 106 may sample a second random value, n.

In a sixth step, the identity provider computer 106 may hash one or more identity attributes of the user, m, (e.g., date of birth of the user, home address of the user, account number of the user, etc.) using the second random value, n, to form an encoded attribute, h=hash(m‖n). The second random value, n, is used to hash the identity attributes, m, so that the relying party computer 102 cannot exploit potential homomorphic properties of the encryption scheme used to learn information about the plaintext identity attributes.

In a seventh step, the identity provider computer 106 may sample a third random value, r.

In an eighth step, the identity provider computer 106 may encrypt the identity attribute using the ephemeral public key, ek, and the third random value, r, to form an encrypted identity attribute, $c^*=(g_1^r, ek^{r*}g_1^h)$. The encrypted identity attribute, $c^*$, may be an example of one or more derivatives of one or more identity attributes associated with a user, m.

In a ninth step, after forming the encrypted identity attribute, $c^*$, the identity provider computer 106 may sign the encrypted identity attribute, $c^*$, and the second random number, n, using the identity provider signing key, $aSK_{ip}$, to form a signed identity attribute, sig_c=RSA/ECDSA.SIGN ($aSK_{ip}$, (n, $c^*$)).

The identity provider computer 106 may then transmit the ephemeral public key, ek, the second random number, n, the encrypted identity attribute, $c^*$, the signed identity attribute, sig_c, and the encrypted trapdoor, $KEM_u$, to the identity network computer 104. After the identity network computer 104 receives and stores the above data in memory, the identity network computer 104 may perform attestations with respect to the user's identity attributes, as described below.

FIG. 2 shows a flow diagram of a relying party computer 102 requesting attestations of a user from an identity network computer 104. The relying party may be a resource provider which operates the relying party computer 102. The relying party computer 102 may interact with the user device 100 in a transaction, such as an in-person transaction performed between the user device 100 and an access device (e.g., a POS terminal) operated by the resource provider, and receive a user identifier (e.g., a username, a primary account number (PAN), etc.) from the user device 100. The user identifier may uniquely identify an account of the user at the identity network computer 104 which stores encrypted identity tokens of the user (e.g., many encrypted identity attributes, c*). The transaction may require that the user verify some part of their identity to the relying party. For example, a transaction involving alcohol may require the user to verify they are above the minimum legal drinking age.

In step S200, the relying party computer 102 may transmit an identity attribute request comprising a query set, W, and the relying party public key, $ePK_{rp}$, to the identity network computer 104 to request an identity attribute of the user operating the user device 100. The query set, W, may comprise a plurality of test identity attributes, $w_i$, that are used to perform a comparison (e.g., a set membership predicate to determine if the identity attribute of the user is included in the set of test identity attributes of the query set, W={$w_1$, $w_2$, $w_3$, . . . , $w_i$}) of the identity attribute to the elements of the query set. For example, the query set W may be a list of ages above 21 and be used to learn an attestation that the user operating the user device 100 is above 21 years old.

In step S202, after receiving the identity attribute request from the relying party computer 102, the identity network computer 104 may retrieve the encrypted trapdoor, $KEM_u$, and the identity provider public key, $aPK_{ip}$, from memory, and transmit the encrypted trapdoor, $KEM_u$, the identity provider public key, $aPK_{ip}$, and the relying party public key, $ePK_{rp}$ to the user device 100.

In step S204, after receiving the encrypted trapdoor, $KEM_u$, the identity provider verification key, $aPK_{ip}$, and the relying party public key, $ePK_{rp}$, the user device 100 may decrypt the encrypted trapdoor, $KEM_u$, using the user secret key, $eSK_u$, (e.g., decrypt the encrypted trapdoor, $KEM_u$, using a decryption function RSA.DEC($eSK_u$, $KEM_u$) to retrieve the trapdoor, td, and signed trapdoor, sig_td,). The user device 100 may then verify the signature on the trapdoor using the identity provider verification key, $aPK_{ip}$. After successfully verifying the signature on the trapdoor, td, the user device 100 may then encrypt the trapdoor, td, and the signed trapdoor, sig_td, using the relying party public key, $ePK_{rp}$, to form a second modified trapdoor, $KEM_{rp}$=RSA.Enc($ePK_{rp}$, (td, sig_td).

In step S206, after forming the second modified trapdoor, $KEM_{rp}$, the user device 100 may then transmit the second modified trapdoor, $KEM_{rp}$, to the identity network computer 104.

In step S208, after receiving the second modified trapdoor, $KEM_{rp}$, the identity network computer 104 may retrieve the encrypted identity attribute, c*, the ephemeral public key, ek, and the second random number, n, from memory. The identity network computer 104 may then verify the signed identity attribute, sig_c, by using the identity provider public key, $aPK_{ip}$, and the encrypted identity attribute, c*. The identity network computer 104 may then loop through the query set, W. For each element, $w_i$, in the query set, W, the identity network computer 104 may encode the element, $w_i$, using the second random number, n, (e.g., the random value that was used to encode the identity attribute) to form an encoded element, $h_i$=hash($w_i$||n). The identity network computer 104 may then sample a random value, $r_i$ (or r_i) The random value $r_i$ may be used to encrypt the element, $w_i$, to form an encrypted element, $c_i$, (e.g., similarly to the encrypted identity attribute, c*, the encrypted element, $c_i$, may be computed as $c_i$=($g_1^{r\_i}$, $ek^{r\_i}*g_1^{h\_i}$)). The identity network computer 104 may perform a permutation of the encrypted elements, $c_i$, to reorder them. After permuting the encrypted elements, $c_i$, the identity network computer 104 may form an obscured query set, C using the encrypted elements, $c_i$ (e.g., C={$c_{15}$, $c_{123}$, $c_1$, $c_2$, $c_{31}$, . . . }).

In step S208, after forming the obscured query set, C, the identity network computer 104 may then transmit the obscured query set, C, the encrypted identity attribute, c*, the signed identity attribute, sig_c, the second modified trapdoor, $KEM_{rp}$, and the identity provider verification key, $aPK_{ip}$, to the relying party computer 102.

In step S210, after receiving the above data, the relying party computer 102 may decrypt the relying party encrypted trapdoor, $KEM_{rp}$, using the relying party private key, $eSK_{rp}$, to retrieve the trapdoor, td, and the signed trapdoor, sig_td. The relying party computer 102 may then verify the signature on the signed trapdoor, sig_td, using the identity provider public key, $aPK_{ip}$, the trapdoor, td. The relying party computer 102 may also verify the signature on the signed identity attribute, sig_c, using the identity provider public key, $aPK_{ip}$, and the encrypted identity attribute, c*. The relying party computer 102 may compare the encrypted identity attribute c*=($T_1$, $U_1$) to each encrypted element $c_i$=($T_2$, $U_2$) in the encrypted domain. For example, if c*=($T_1$, $U_1$)=($g_1^r$, $ek^{r}*g_1^h$) and $c_i$=($T_2$, $U_2$)=($g_1^{r\_i}$, $ek^{r\_i}*g_1^{h\_i}$), the equality check may be performed using the equation e($U_1$, $g_2$)/e($T_1$, td)=e($U_2$, $g_2$)/e($T_2$, td). The relying party computer 102 may stop when the encrypted identity attribute, c*, is equal to an encrypted element, $c_i$, or when the encrypted identity attribute, c*, has been compared (and confirmed to not be equal to one of) to every encrypted element, $c_i$, in the obscured query set, C. The relying party computer 102 may thus learn an attestation of the identity attribute (e.g., true if the identity attribute is equal to some element in the query set W, or false if the identity attribute is not equal to any element in the query set W).

An alternative approach uses an El-Gamal encryption scheme. The El-Gamal encryption scheme may include a plurality of functions. The plurality of functions may include an encryption function (e.g., a function El.Enc(msg, ek; r) that samples a random number r and outputs ($g^r$, $ek^r*g^{msg}$)), a decrypt to zero function (e.g., a function El.DecZero(ct= (a,b), dk) that checks if the input decrypts to zero by outputting 1 if $$g^0 = \frac{b}{a^{dk}}),$$

an add function (e.g., a function El.Add($ct_1$, $ct_2$, ek) that encrypts the sum of ciphertexts encrypted by $ct_1$ and $ct_2$), a subtract function (e.g., a function El.Subtract($ct_1$, $ct_2$, ek) that outputs a ciphertext that encrypts the difference of the plaintexts encrypted by $ct_1$ and $ct_2$), a constant multiple function (e.g., a function El.Subtract(ct, const, ek) that multiplies the product of the constant const with the plaintext encrypted by ct), and a re-randomize function (e.g., a function El.ReRandomize(ct, ek) that encrypts the same plaintext as ct but with fresh randomness).

Figure 3:
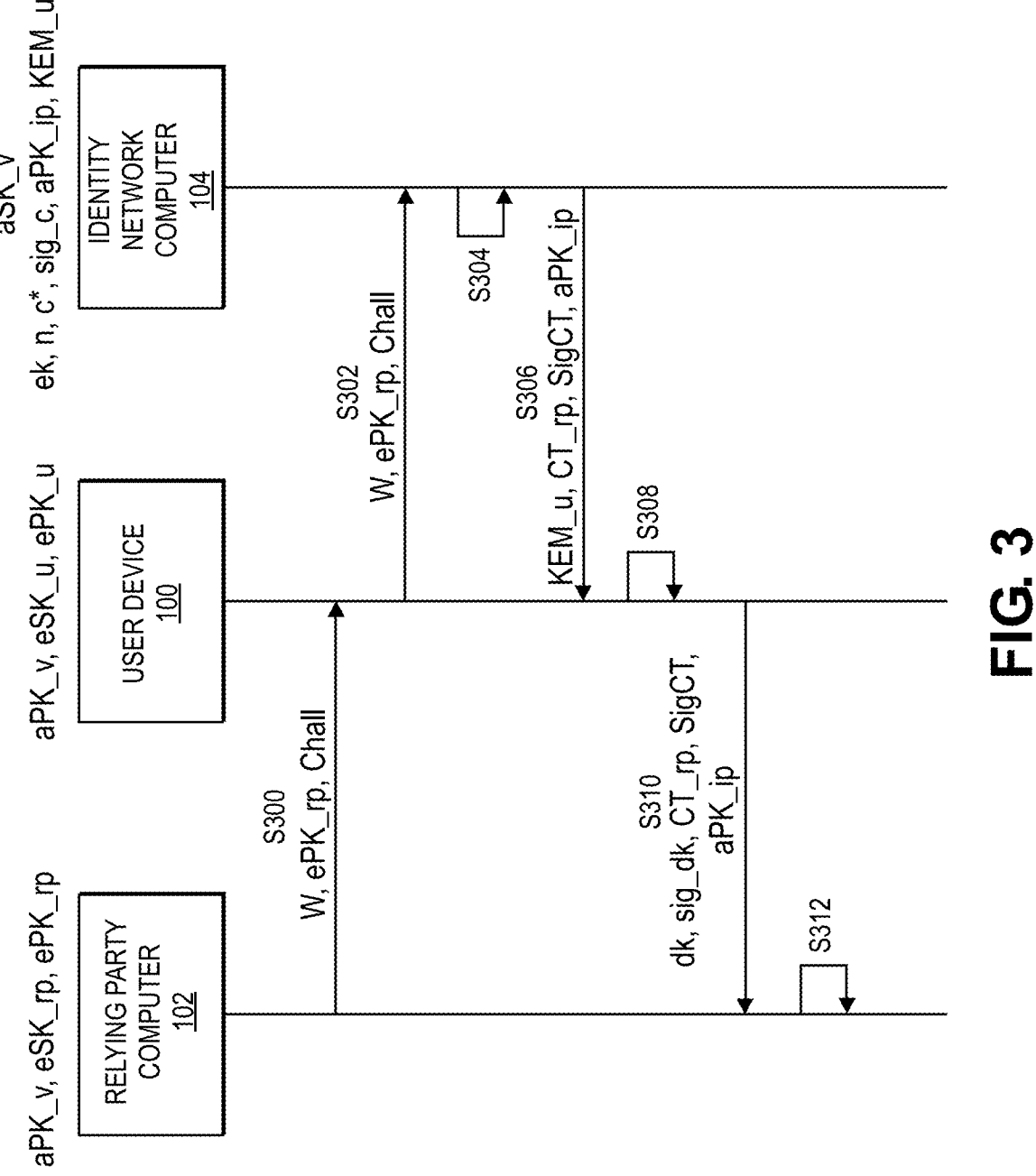
FIG. 3 shows a flow diagram of a relying party computer requesting attestations of a user from a user device.
Figure 4:
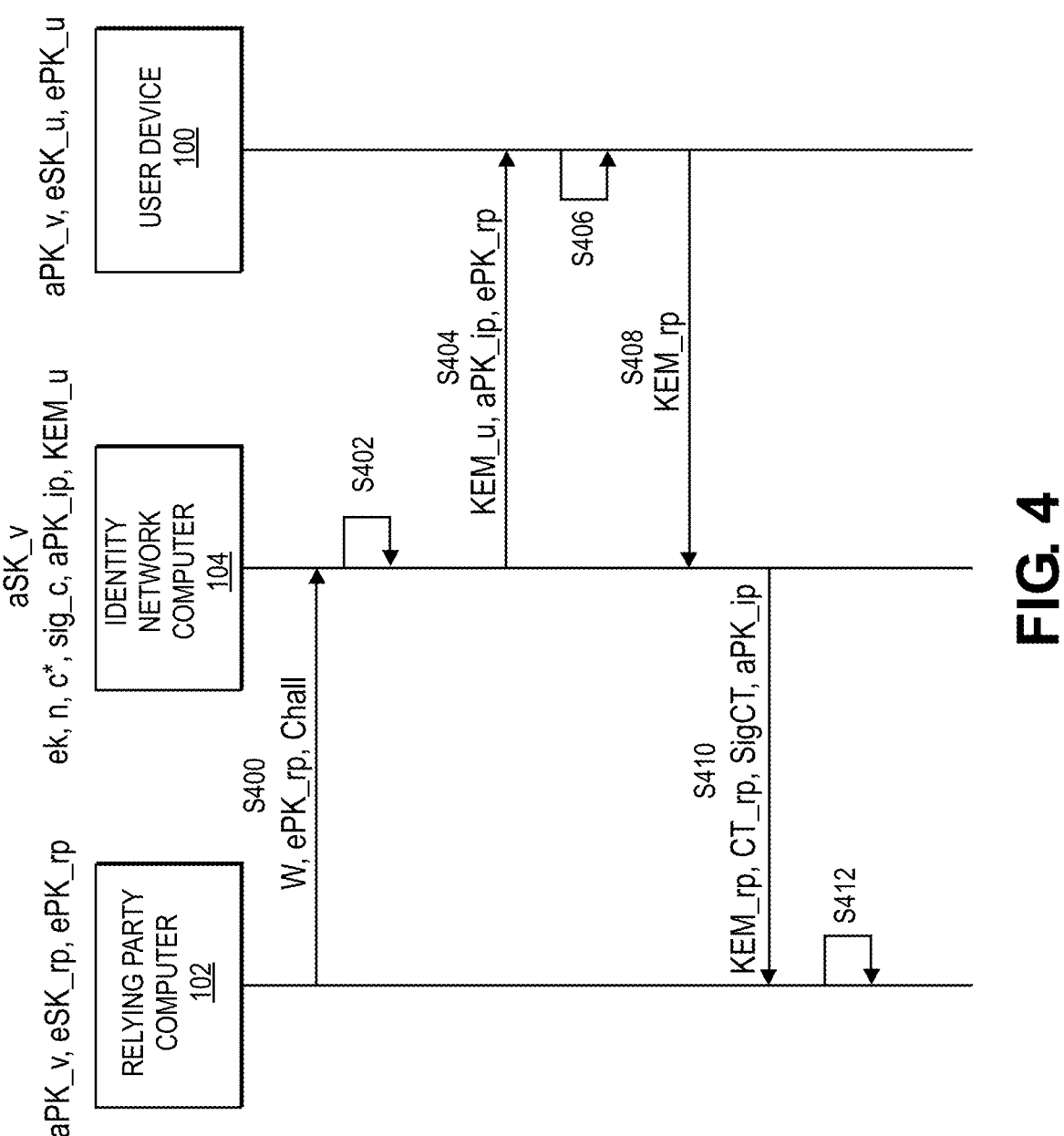
FIG. 4 shows another flow diagram of a relying party computer requesting attestations of a user from an identity network computer.

Prior to the flows described in FIG. 3 and FIG. 4, the user device 100 may populate identity tokens by interacting with the identity network computer 104, and the identity provider computer 106. The identity network computer 104 may generate an identity network signing key pair ($aPK_v$, $aSK_v$) (e.g., an identity network public key, $aPK_v$, and an identity network signing key, $aSK_v$). The identity network computer 104 may select group, G, and pick a generator, g. The group, G, and the generated, g, may be public parameters, and be used as input by all parties in all of the following algorithms and those described in FIGS. 3 and 4. The user device 100 may generate a user key pair ($ePK_u$, $eSK_u$) (e.g., a user public key, $ePK_u$, and a user private key, $eSK_u$). The relying party computer 102 may also generate a relying party key pair ($ePK_{rp}$, $eSK_{rp}$) (e.g., a relying party public key, $ePK_{rp}$, and a relying party private key, $eSK_{rp}$). The identity provider computer 106 may generate an identity provider signing key pair for the user ($aPK_{ip}$, $aSK_{ip}$) (e.g., an identity provider public key, $aPK_{ip}$, and an identity provider signing key, $aSK_{ip}$), and transmit the public key, $aPK_{ip}$, to the identity network computer 104. The identity network key pair ($aPK_v$, $aSK_v$), user key pair ($ePK_u$, $eSK_u$), relying party key pair ($ePK_{rp}$, $eSK_{rp}$), and the identity provider signing key pair ($aPK_{ip}$, $aSK_{ip}$) may be generated using cryptographic algorithms such as Rivest-Shamir-Adleman (RSA) or Elliptic Curve Digital Signature Algorithm (ECDSA). After generating the identity provider key pair, the identity provider computer 106 may then begin to populate an identity token.

In a first step, the identity provider computer 106 may sample a random value x.

In a second step, after generating the first random value x, the identity provider computer 106 may use the random value x to generate an ephemeral public key, $ek=g_1^x$, and a secret key, $dk=x$ for the user device 100. The secret key, dk, may be an example of a first modified trapdoor.

In a third step, after generating the secret key, dk, the identity provider computer 106 may sign the first modified trapdoor, dk, to form a signed modified secret key, $sig\_dk=RSA/ECDSA.SIGN(aSK_{ip},dk))$ or a signed modified trapdoor.

In a fourth step, after signing the first modified trapdoor, the identity provider computer 106 may encrypt the first modified trapdoor, dk, along with the signed modified trapdoor, $sig\_dk$, to form an encrypted trapdoor, $KEM_u=RSA.ENC(ePK_u, (dk, sig\_dk))$.

In a fifth step, after forming the encrypted trapdoor, dk, the identity provider computer 106 may hash one or more identity attributes of the user, m, (e.g., date of birth of the user, home address of the user, account number of the user, etc.) to form a hashed identity attribute, $h=hash(m)$. The hash may allow the encoding of large messages (e.g., many or large identity attributes). The hashed identity attribute, h, may be an example of one or more derivatives of one or more identity attributes associated with a user, m.

In a sixth step, after hashing the identity attributes of the user, the identity provider computer 106 may encrypt the hashed identity attribute, h, to form an encrypted identity attribute, $c^*=El.Enc(h, ek)$. The encrypted identity attribute, $c^*$, may be an example of one or more derivatives of one or more identity attributes associated with a user, m.

In a seventh step, after forming the encrypted identity attribute, the identity provider computer 106 may sign the identity attribute using the identity provider signing key, $aSK_{ip}$, to form a signed identity attribute, $sig\_c=RSA/ECDSA.Sign(aSK_{ip}, c^*)$.

The identity provider computer 106 may then transmit the ephemeral public key ek, the encrypted identity attribute $c^*$, the signed identity attribute, $sig\_c$, and the encrypted trapdoor, $KEM_u$, to the identity network computer 104. After the identity network computer 104 receives and stores the above data in memory, the identity network computer 104 may perform attestations of the user's identity attributes as described below.

FIG. 3 shows a flow diagram of a relying party computer 102 requesting attestations of a user from a user device 100. The relying party may be a resource provider which operates the relying party computer 102. The relying party computer 102 may interact with the user device 100 in a transaction, such as an eCommerce transaction, performed between the user device 100 and the relying party computer 102, and may receive a user identifier from the user device. The user identifier may uniquely identify an account of the user at the identity network computer 104 which stores encrypted identity tokens of the user (e.g., many encrypted identity attributes, $c^*$). The transaction may require that the user verifies some part of their identity to the relying party (e.g., a transaction may involve applying a discount to users in a set of zip codes).

In step S300, the relying party computer 102 may transmit an identity attribute request comprising a query set, W, the relying party public key, $ePK_{rp}$, and a challenge, Chall, to the user device 100. The query set, W, may comprise a plurality of test identity attributes, $w_i$, that are used to perform a comparison (e.g., a set membership prediciate to determine if the identity attribute of the user is included in the set of test identity attributes of the query set, $W=\{w_1, w_2, w_3, \ldots, w_i\}$) of the identity attribute to the elements of the query set. For example, the query set, W, may be a plurality of zip codes in which a discount applies, and be used to learn an attestation that the user operating the user device 100 is a resident of the list of zip codes.

In step S302, after receiving the above data, the user device 100 may forward the query set, W, the relying party public key, $ePK_{rp}$, and the challenge, Chall, to the identity network computer 104.

In step S304, after receiving the query set, the relying party public key, $ePK_{rp}$, and the challenge, Chall, the identity network computer 104 may retrieve the ephemeral public key, ek, the encrypted identity attribute, $c^*$, and the signed identity attribute, $sig\_c$, from memory. The identity network computer 104 may then verify the signed identity attribute, $sig\_c$, by using the identity provider public key $aPK_{ip}$ and the encrypted identity attribute, $c^*$. The identity network computer 104 may then loop through the query set, W. For each element, $w_i$, the identity network computer 104 may hash the element, $w_i$, using the hash that was used to hash the identity attribute (e.g., $h=hash(m)$) to form a hashed element, $h_i=hash(w_i)$. The identity network computer 104 may then sample a random value, $r_i$. The identity network computer 104 may thereafter compute an encrypted element, $c_i$, using the El-Gamal encryption scheme. For example, the encrypted elements, $c_i$, may be computed as $c_i=El.Enc(n^* (h-h_i), ek)$ using the encryption function, the subtract function, and the constant multiplication function of the El-Gamal scheme as preliminaries.

The identity network computer 104 may then perform a permutation of the encrypted elements, $c_i$, to reorder. After permuting the encrypted elements, $c_i$, the identity network computer 104 may form an obscured query set, $CT_{rp}=HybRSA.Enc(ePK_{rp}, \{c_{12}, c_2, c_{73}, \ldots, c_i\})$ using the plurality of encrypted elements, $c_i$, and the relying party public key, $ePK_{rp}$, under RSA encryption along with a symmetric encryption scheme (e.g., Advanced Encryption Standard-Galois/Counter Mode (AES-GCM), which may be more efficient when encrypting a large amount of data).

The identity network computer 104 may then sign the obscured query set, $CT_{rp}$, and the challenge, Chall, using the identity network signing key, $aSK_v$, to form a signed obscured query set, $sig\_CT=RSA/ECDSA.Sign(aSK_v, (CT_{rp}, Chall))$.

In step S306, after forming the signed obscured query set, the identity network computer 104 may transmit the encrypted trapdoor, $KEM_u$, the obscured query set, $CT_{rp}$, the signed obscured query set, sig_CT, and the identity provider public key, $aPK_{ip}$, to the user device 100.

In step S308, after receiving the above data, the user device 100 may decrypt the encrypted trapdoor, $KEM_u$, using the user secret key, $eSK_u$, to retrieve the first modified trapdoor (which is a secret key), dk, and the signed modified trapdoor (which can be a signed secret key), sig_dk. The user device 100 may then verify the signature on the signed modified trapdoor (which can be the signed secret key), sig_dk, using the identity provider public key, $aPK_{ip}$, and the first modified trapdoor, dk (which is the secret key).

In step S310, after verifying the signature on the signed modified trapdoor, sig_dk, the user device 100 may transmit the first modified trapdoor, dk, the signed modified trapdoor, sig_dk, the obscured query set $CT_{rp}$, the signed obscured query set, sig_CT, and the identity provider verification key $aPK_{ip}$, to the relying party computer 102.

In step S312, after receiving the above data, the relying party computer 102 may decrypt the obscured query set, $CT_{rp}$, using the relying party secret key, $eSK_{rp}$, to retrieve the encrypted elements $\{c_1, c_2, c_3, \ldots, c_i\}$. As the encrypted elements have been permuted by the identity network computer 104 in step S304, the relying party computer 102 may not know the order of the encrypted elements (e.g., the relying party computer 102 retrieves i total encrypted elements $c_i$ not necessarily in order). The relying party computer 102 may then verify the signature on the signed modified trapdoor, sig_dk, using the identity provider public key, $aPK_{ip}$, and the first modified trapdoor, dk. The relying party computer 102 may also verify the signature on the signed obscured query set, sig_CT, using the identity network public key, $aPK_v$, the obscured query set, $CT_{rp}$, and the challenge, Chall. After successfully verifying the signatures, the relying party computer 102 may use the decrypt to zero function of the El-Gamal encryption scheme to check if the encrypted query elements $c_i$ decrypt to zero. If any one of the encrypted query elements decrypt to zero, then the relying party computer 102 learns that the identity attribute of the user operating the user device 100 is a member of the query set, W (e.g., the user is a resident of at least one of the plurality of zip codes).

FIG. 4 shows another flow diagram of a relying party computer requesting attestations of a user from an identity network computer. The flow described by FIG. 4 may use the El-Gamal encryption scheme that was used in the method associated with FIG. 3. However, similar to FIG. 2, the flow of FIG. 4 may occur when the relying party computer 102 interacts with the user device 100 in an in-person transaction performed between the user device 100 and an access device (e.g., a POS terminal) operated by the resource provider.

In step S400, the relying party computer 102 may transmit an identity attribute request comprising a query set, W, the relying party public key, $ePK_{rp}$, and a challenge, Chall, to the user device 100. The query set, W, may comprise a plurality of test identity attributes, $w_i$, that are used to perform a comparison (e.g., a set membership prediciate to determine if the identity attribute of the user is included in the set of test identity attributes of the query set, $W = \{w_1, w_2, w_3, \ldots, w_i\}$) of the identity attribute to the elements of the query set. For example, the query set, W, may be a plurality of zip codes in which a discount applies, and be used to learn an attestation that the user operating the user device 100 is a resident of the list of zip codes.

In step S402, after receiving the query set, the relying party public key, and the challenge from the relying party computer 104, the identity network computer 104 may retrieve the ephemeral public key, ek, the encrypted identity attribute, c*, and the signed identity attribute, sig_c, from memory. The identity network computer 104 may then verify the signed identity attribute, sig_c, by using the identity provider public key $aPK_{ip}$ and the encrypted identity attribute, c*. The identity network computer 104 may then loop through the query set, W. For each element, $w_i$, the identity network computer 104 may hash the element, $w_i$, using the hash that was used to hash the identity attribute (e.g., h=hash(m)) to form a hashed element, $h_i$=hash($w_i$). The identity network computer 104 may then sample a random value, $r_i$. The identity network computer 104 may thereafter compute an encrypted element, $c_i$, using the El-Gamal encryption scheme. For example, the encrypted elements, $c_i$, may be computed as $c_i$=El.Enc(n*(h-$h_i$), ek) using the encryption function, the subtract function, and the constant multiplication function of the El-Gamal scheme as preliminaries.

The identity network computer 104 may perform a permutation of the encrypted elements, $c_i$, to reorder the encrypted elements. After permuting the encrypted elements, $c_i$, the identity network computer 104 may form an obscured query set, $CT_{rp}$=HybRSA.Enc($ePK_{rp}$, $\{c_1, c_2, c_3, \ldots, c_i\}$) using the plurality of encrypted elements, $c_i$, and the relying party public key, $ePK_{rp}$, under RSA encryption along with a symmetric encryption scheme (e.g., Advanced Encryption Standard-Galois/Counter Mode (AES-GCM)). The identity network computer 104 may then sign the obscured query set, $CT_{rp}$, and the challenge, Chall, using the identity network signing key, $aSK_v$, to form a signed obscured query set, sig_CT=RSA/ECDSA.Sign($aSK_v$, ($CT_{rp}$, Chall)).

In step S404, after forming the signed obscured query set, the identity network computer 104 may transmit the encrypted trapdoor, $KEM_u$, the identity provider public key, $aPK_{ip}$, and the relying party public key $ePK_{rp}$, to the user device 100.

In step S406, after receiving the above data from the identity network computer 104, the user device 100 may decrypt the encrypted trapdoor, $KEM_u$, using the user secret key, $eSK_u$, to retrieve the first modified trapdoor (e.g., a secret key), dk, and the signed modified trapdoor (e.g., a signed secret key), sig_dk. The user device 100 may then verify the signature on the signed modified trapdoor, sig_dk, using the identity provider public key, $aPK_{ip}$, and the first modified trapdoor, dk. The user device 100 may additionally encrypt the first modified trapdoor, dk, and the signed modified trapdoor, sig_dk, using the relying party public key, $ePK_{rp}$, to form a second modified trapdoor, $KEM_{rp}$=RSA.Enc($ePK_{rp}$, (dk, sigdk)).

In step S408, after forming the second modified trapdoor, $KEM_{rp}$, the user device 100 may transmit the second modified trapdoor, $KEM_{rp}$, to the identity network computer 104.

In step S410, after receiving the second modified trapdoor from the user device, the identity network computer 104 may transmit the second modified trapdoor, $KEM_{rp}$, the obscured query set $CT_{rp}$, the signed obscured query set, sig_CT, and the identity provider verification key $aPK_{ip}$, to the relying party computer 102.

In step S412, after receiving the above data from the identity network computer 104, the relying party computer 102 may decrypt the second modified trapdoor, $KEM_{rp}$, using the relying party secret key $eSK_{rp}$ to retrieve the first modified trapdoor, dk, and the signed modified trapdoor, sig_dk. The relying party computer 102 may then decrypt the obscured query set, $CT_{rp}$, using the relying party secret key, $eSK_{rp}$, to retrieve the encrypted elements $\{c_1, c_2,$ $c_3, \ldots, c_i$}. The relying party computer 102 may then verify the signature on the signed modified trapdoor, sig_dk, using the identity provider public key, $aPK_{ip}$, and the first modified trapdoor, dk. The relying party computer 102 may also verify the signature on the signed obscured query set, sig_CT, using the identity network public key, $aPK_v$, the obscured query set, $CT_{rp}$, and the challenge, Chall. After successfully verifying the signatures, the relying party computer 102 may use the decrypt to zero function of the El-Gamal encryption scheme to check if the encrypted query elements $c_i$ decrypt to zero. If any one of the encrypted query elements decrypt to zero, then the relying party computer 102 learns that the identity attribute of the user operating the user device 100 is a member of the query set, W (e.g., the user is a resident of at least one of the plurality of zip codes).

Although set membership predicates were described, the methods can be applied to inequality checks. An age inequality check will require to verify, for example, that a user is over the age of 21. During a transaction the question may be therefore translated into a query-set based on the current day's date. Naively, one could take the current date, say 2021-01-01 and subtract 21 years, to get the base date 2000-01-01. The query set could then be every day before this for 100 years, i.e. {1900-01-01, ..., 2000-01-01}. This, however, would create a set of size ~36500, which requires up to the same number of equality checks. To improve efficiency, an attribute may be provisioned as both an encryption of the user's full date-of-birth and an encryption of their year-of-birth. Then, the query set is again based on the base date (2000-01-01), the set may be each of the 100 years prior to 2000, and all of the days up to the base date in the current year. For our example this would be: {1900, ..., 1999, ..., 2000-01-01}. This set will be of maximum size 100+365=465. It will, however, require two equality checks for each element of the encrypted set, one against the user's encrypted year-of-birth, and another against the user's date-of-birth. The maximum number of equality checks is therefore reduced to 465*2=930. A further efficiency may be made by performing the opposite equality check (e.g., check if user is less than 21 rather than greater than). The query set may then be of max size 20+365=385 with the maximum number of checks being 385*2=770.

Figure 5:
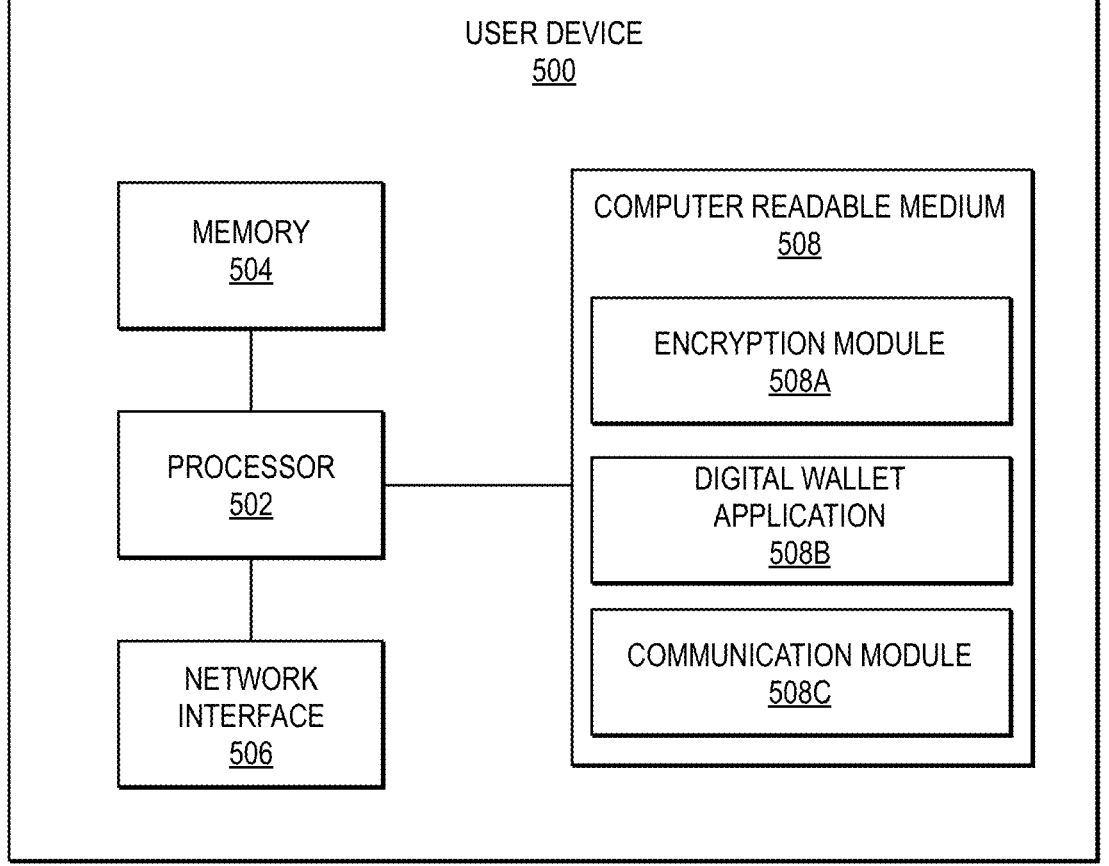
FIG. 5 shows a block diagram of an exemplary user device.

FIG. 5 shows a block diagram of an exemplary user device 500. The user device 500 may be operated by a user. The user device 100 may comprise a processor 502. The processor 502 may be coupled to a memory 504, a network interface 506, and a computer readable medium 508. The computer readable medium 508 may comprise any suitable number and types of software modules.

The memory 504 may be used to store data and code. The memory 504 may be coupled to the processor 502 internally or externally (e.g., via cloud based data storage), and may comprise any combination of volatile and/or non-volatile memory such as RAM, DRAM, ROM, flash, or any other suitable memory device The network interface 506 may include an interface that can allow the user device 500 to communicate with external computers and/or devices. The network interface 506 may enable the user device 500 to communicate data to and from another device such as access devices, relying party computers, identity network computers, identity provider computers, etc. Some examples of the network interface 506 may include a modem, a physical network interface (such as an Ethernet card or other Network Interface Card (NIC)), a virtual network interface, a communications port, a Personal Computer Memory Card International Association (PCM-CIA) slot and card, or the like. The wireless protocols enabled by the network interface 506 may include Wi-Fi. Data transferred via the network interface 506 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 506 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

The computer readable medium 508 may comprise a number of software modules including, but not limited to, an encryption module 508A, a digital wallet application 408B, and a communication module 508C.

The computer readable medium 408 may comprise code, executable by the processor 402, for a method comprising: receiving, by a user device from an identity network computer, a query set comprising a plurality of test identity attributes; encrypting, by the user device, the query set to form an obscured query set; computing, by the user device, a zero-knowledge proof using the obscured query set and an encrypted identity attribute associated with a user operating the user device; and transmitting, by the user device to the identity network computer, the obscured query set and the zero-knowledge proof, wherein the identity network computer verifies the zero-knowledge proof, retrieves an encrypted identity attribute associated with the user, evaluates the obscured query set with respect to the encrypted identity attribute, and transmits a result of the evaluation to a relying party computer.

The encryption module 508A may comprise code that causes the processor 502 to perform encryptions of data. The encryption module 508A may enable the user device 500 to generate public and private key pairs, and signing key pairs. The encryption module 508A may perform encryptions using several encryption algorithms, such as RSA and ECDSA. For example, the encryption module 508A may generate a user public key and a user private key, and may additionally encrypt data, such as query sets, and obscure them using encryption keys. The encryption module 508A may additionally perform encryptions using PKEET schemes, or El-Gamal encryption schemes.

The digital wallet application 508B may comprise code that causes the processor 502 to perform interactions. For example, the digital wallet application 508B may be a banking application which allows the user device 500 to communicate with relying parties. The digital wallet application 508B may allow the user device 500 to perform interactions with relying party computers, or access devices associated with relying party computers. For example, prior to the flow of FIGS. 2-4, the user device 100 may communicate with the relying party computer 102 to begin the interaction which requires the predicate of one or more identity attributes.

The communication module 508C, in conjunction with the processor 502, can generate messages, forward messages, reformat messages, and/or otherwise communicate with other entities. For example, communication module 508C can be used to facilitate communications between the user device 500 and other computers.

Figure 6:
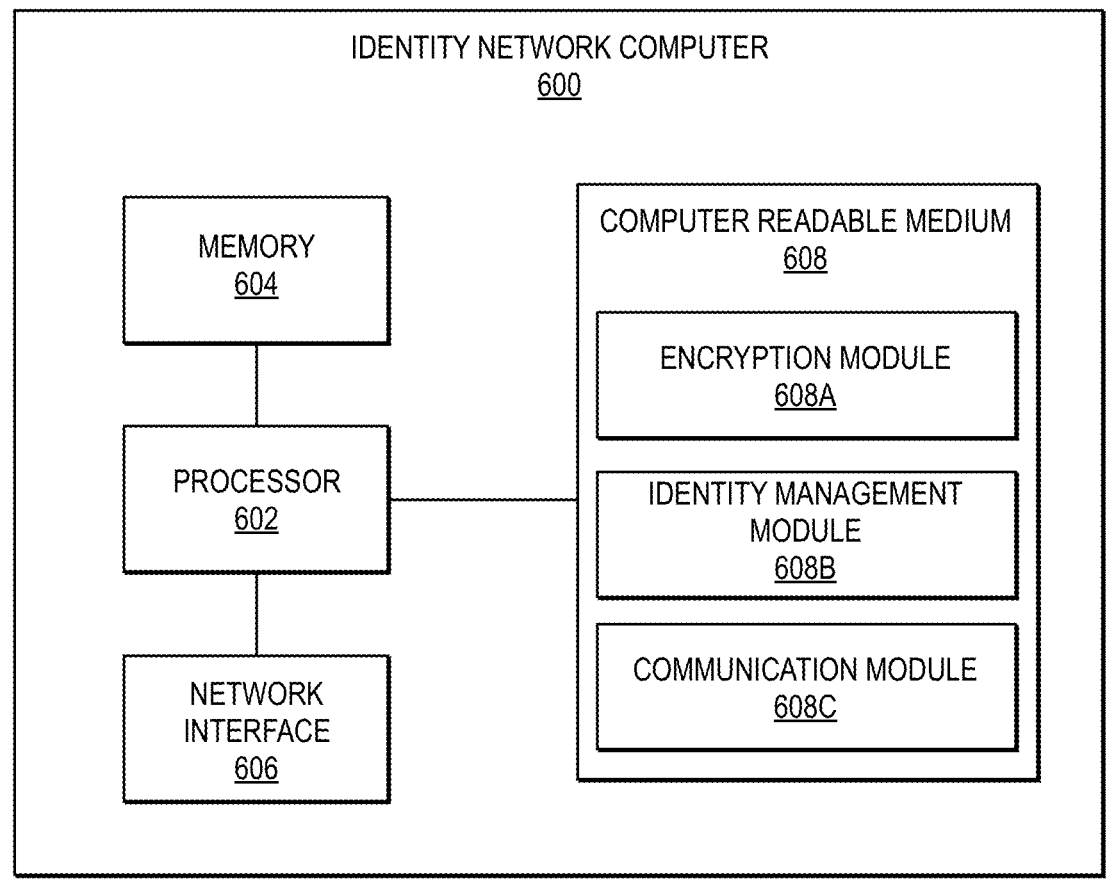
FIG. 6 shows a block diagram of an exemplary identity network computer.

FIG. 6 shows a block diagram of an exemplary identity network computer 600. The identity network computer 600 may be operated by a processing network such as a payment processing network, or an identity network. The identity network computer 600 may comprise a processor 602. The processor 602 may be coupled to a memory 604, a network interface 606, and a computer readable medium 608. The computer readable medium 608 may comprise any suitable number and types of software modules.

The memory 604 and the network interface 606 may have the same or different features to the previously described memory 504 and network interface 506.

The computer readable medium 608 may comprise code, executable by the processor 602, for a method comprising: receiving, by an identity network computer, a query set comprising a plurality of test identity attributes; retrieving, by the identity network computer, one or more derivatives of one or more identity attributes associated with a user, and an encrypted trapdoor; computing, by the identity network computer, an obscured query set using the query set, and optionally the derivatives of the one or more identity attributes; and transmitting, by the identity network computer, (i) the obscured query set and the encrypted trapdoor to a user device associated with the user, which generates and transmits a first modified trapdoor and the obscured query set to a relying party computer, or (ii) the obscured query set and a second modified trapdoor to the relying party computer, wherein the relying party computer uses the obscured query set, and the first modified trapdoor or the second modified trapdoor, to determine if the one or more the identity attributes of the one or more derivatives of the identity attributes is a member of the query set associated with the obscured query set.

The computer readable medium 608 may comprise a number of software modules including, but not limited to, an encryption module 608A, an identity management module 608B, and a communication module 608C.

The encryption module 608A may have the same of different features to the previously described encryption module 508A. The encryption module 608A may be used by the identity network computer 600 to perform encryptions necessary to complete set membership predicates and/or inequality predicates.

The identity management module 608B may comprise code, executable by the processor 600, for managing identity tokens. For example, identity tokens may comprise identity attributes, and may be managed by the identity management module 608B. The identity management module 608B may hold accounts for users which are identified by user identifiers. The identity management module 608B may receive an identity attribute request, and retrieve an encrypted identity attribute associated with the identity attribute request (e.g., a user and a query set).

The communication module 608C may have the same of different features to the previously described communication module 508C.

Figure 7:
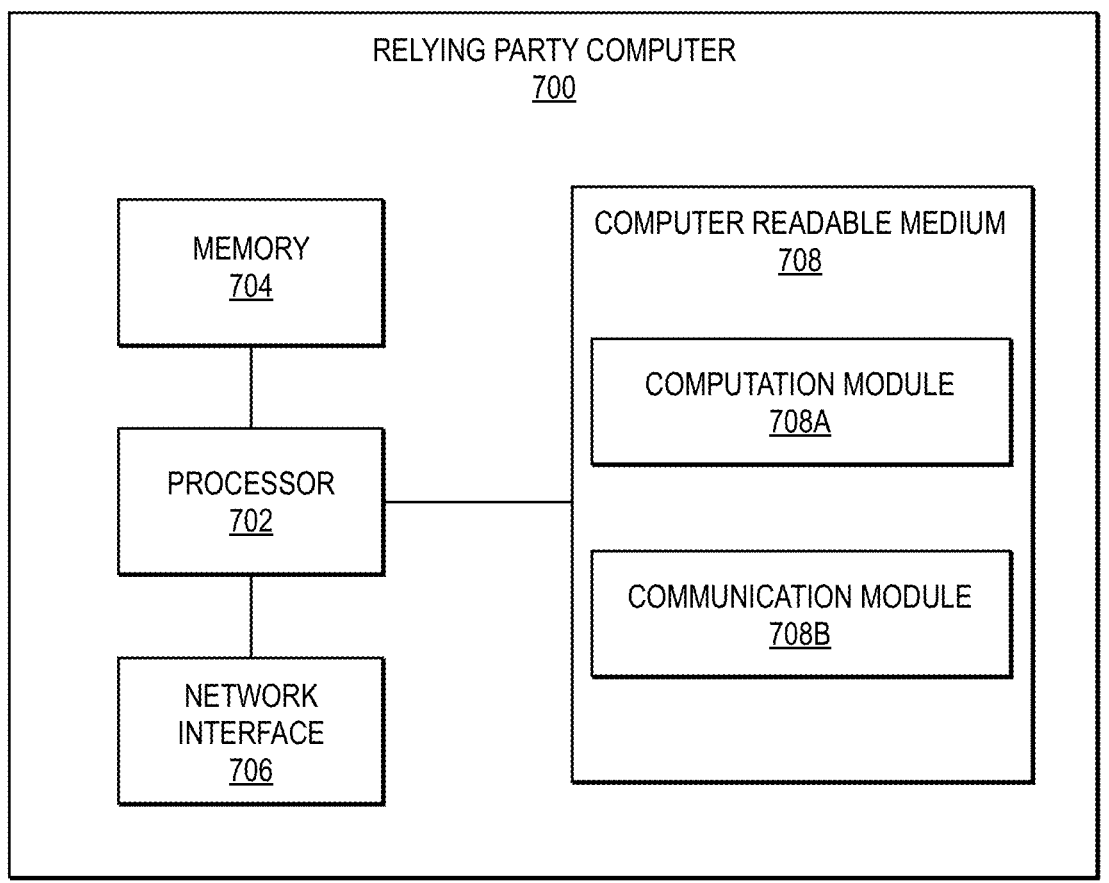
FIG. 7 shows a flow diagram of an exemplary relying party computer.

FIG. 7 shows a flow diagram of an exemplary relying party computer 700. The relying party computer 700 may be operated by a resource provider such as a merchant. The relying party computer 700 may comprise a processor 702. The processor 702 may be coupled to a memory 704, a network interface 706, and a computer readable medium 708. The computer readable medium 708 may comprise any suitable number and types of software modules.

The memory 704 and the network interface 706 may have the same or different features to the previously described memory 504 and network interface 506.

The computer readable medium 708 may comprise a number of software modules including, but not limited to, a computation module 708A, and a communication module 708C.

The computation module 708A may comprise code, executable by the processor 700, to perform computations. For example, the computation module 708A may enable the relying party computer 700 to compute obscured query sets, or to determine if the one or more the identity attributes of the one or more derivatives of the identity attributes is a member of the query set associated with the obscured query set.

The communication module 708B may have the same of different features to the previously described communication module 508C.

Figure 8:
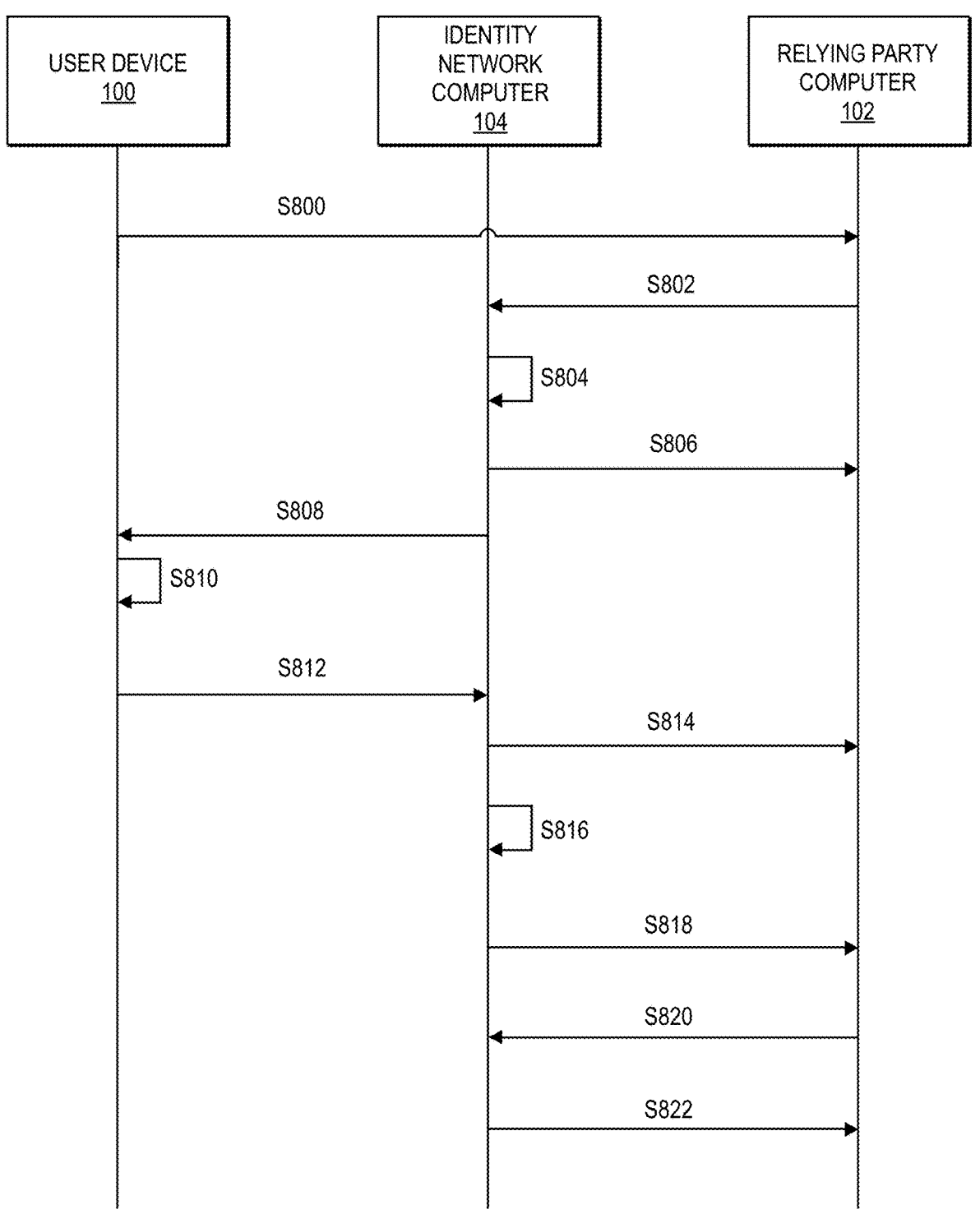
FIG. 8 shows a flow diagram of a relying party computer requesting attestations of a user from an identity network computer in an interaction.

FIG. 8 shows a flow diagram of a relying party computer requesting attestations of a user from an identity network computer in an interaction. The flow of FIG. 8 may be an example of a flow similar to that of FIGS. 2-4, where the interaction between a user and the relying party occurs in-person. A trusted identity network computer 104 may verify zero-knowledge proofs that were generated by a user device 100 operated by the user. The zero-knowledge proofs may be similar to the set membership predicates described in the descriptions of FIGS. 2-4.

In step S800, the user may operate the user device 100 initiate an interaction with the relying party computer 102. For example, the user may tap the user device 100 (e.g., a mobile phone) to an access device (e.g., a POS terminal) operated by the relying party. A digital wallet application on the user device may facilitate communications between the user device and the access device. The user device 100 may transmit a user identifier, which indicates that the user has an identity account at the identity network computer 104.

In step S802, after receiving the user identifier from the user device 100, the relying party computer 102 may determine that an identity attestation is required to proceed with the interaction. For example, in a transaction, based on the goods and/or services being purchased by the user, the relying party computer 102 may determine that the user must provide identity attributes to proceed with the transaction. The relying party computer 102 may transmit an identity attribute request to the identity network computer 104 comprising the user identifier and a query set, W. The query set W may comprise a plurality of test identity attributes, $w_i$. For example, the query set W may be a list of ages above 21, and the test identity attributes may be all of the ages above 21. The identity attribute request may additionally comprise a consent request. The consent request may comprise a level of access (e.g., request for plaintext identity attributes, request for attestations of identity attributes, request for masked plaintext data, etc.), a time of access (e.g., a time period in which the relying party can access the user's identity attributes), etc. In some embodiments, a policy token may be transmitted to the user device 100. The policy token may comprise a signature on the query set, W, and may be used to verify the predicate request associated with the query set, W, (e.g., is the user above 21?) can be completed by the relying party computer 102. In some embodiments, the policy token may be transmitted by the identity network computer 104, or an associated computer, to the relying party computer 102 before the flow of FIG. 8 (e.g., for standard identity attribute requests such as minimum legal drinking age confirmations, the relying party computer 102 may request a policy token).

In step S804, after receiving the identity attribute request from the relying party computer 102, the identity network computer 104 may identify the identity account associated with the user based on the user identifier.

In step S806, the identity network computer 104 may forward the status of the user's associated identity account (e.g., user is enrolled, user is enrolled under digital wallet application, user is not enrolled, etc.).

In step S808, after identifying the user's associated identity account, the identity network computer 104, may transmit the query set, W, and optionally the consent request to the user device 100.

In step S810, after receiving the query set W and optionally the consent request from the identity network computer 104, the user may respond to the consent request using the user device 100. To respond to the consent request, the user may be required to authenticate themselves. For example, the user device 100 may prompt (e.g., through a webpage, email, SMS, display on the digital wallet application, etc.) the user to provide a biometric, a password, or other secret known by the user to authenticate themselves. The user device 100 may generate a consent token comprising a user public key, $ePK_u$, an opening, op, and a signature, sig. The opening may be used for a verification that the public key the user device 100 sent was the user public key, $ePK_u$. The opening, op, can contain an ephemeral public key associated with the user, which may be used to open and verify commitments. The signature may be a signature on the query set, W, signed using a user signing key $aSK_u$. The user device 100 may additionally generate a commitment to the signature, sig. The commitment may commit the user device 100 to use the query set, W, and the user public key $ePK_u$. The opening, op, may additionally be used to open and verify the commitment.

After generating the consent token and the commitment, the user device 100 may encrypt the query set, W. The query set, W, may be encrypted in a similar manner to the process described in the PKEET approach of S208 of FIG. 2, or in the El-Gamal approaches of S304 of FIGS. 3 and S402 of FIG. 4, to form an obscured query set. The obscured query set may be used to generate a zero-knowledge proof. The zero-knowledge proof may be a proof that: the user device 100 committed to using the user public key, $ePK_u$, as witnessed by the opening, op, verifies the signature on the query set, W, using a user verification key, $aPK_u$, and that the obscured query set is an encryption of the query set, W.

In step S812, after generating the zero-knowledge proof, the user device 100 may transmit the consent token, the obscured query set, and the zero-knowledge proof to the identity network computer 104.

In step S814, after receiving the consent token, obscured query set, and the zero-knowledge proof from the user device 100, the identity network computer 104 may retrieve an encrypted identity attribute associated with both the user and the query set (e.g., if the query set is a list of ages above 21, the encrypted identity attribute associated with both the user and the query set may be the user's date of birth). The encrypted identity attribute may be encrypted with a private key associated with the user device (e.g., by an identity provider computer, using an ephemeral public key, as described above, in the methods associated with FIG. 2 and FIG. 3). The identity network computer 104 may then verify the zero-knowledge proof. For example, the identity network computer 104 may verify the commitments and signatures, and encrypt the query set, W, using the user public key, $ePK_u$, and verify that the resultant obscured query set is equal to the obscured query set received. After verifying the zero-knowledge proof, the identity network computer 104 may perform an evaluation (e.g., a set membership predicate evaluation as described in steps S212, S312, and S412 of their respective FIGS.) using the obscured query set and the encrypted identity attribute associated with both the user and the query set. The evaluation may be a binary result, such as TRUE or FALSE (e.g., identity attribute associated with the user is/is not a member of the query set). After performing the evaluation, the identity network computer 104 may generate an authorized token comprising the consent token. The authorized token may be valid for the time period consented by the user, and may be used to access the evaluation.

In step S816, after performing the evaluation and generating the authorized token, the identity network computer 104 may transmit the authorized token and the evaluation to the relying party computer 102.

In step S818, after receiving the evaluation from the identity network computer 104, the relying party computer 102 may complete the transaction with the user. For example, the evaluation may be that the user is above 21, and so is able to purchase alcohol, so the relying party computer 102 may complete the transaction. The authorized token may be used to verify the identity attribute of the user in a later identity attribute request. For a subsequent identity attribute request, the relying party computer 102 may compute an obscured query set, and a zero-knowledge proof in place of the user device 100.

In step S820, after generating the obscured query set, the relying party computer 102 may transmit the obscured query set and the authorized token to the identity network computer 104.

In step S822, after receiving the obscured query set and authorized token from the relying party computer 102, the identity network computer 104 may verify the zero-knowledge proof, and retrieve or re-compute the evaluation, before transmitting the evaluation back to the relying party computer 102.

Embodiments of the invention provide a number of advantages. Embodiments of the invention can allow users to interact with relying parties and perform interactions without revealing plaintext identity attributes associated with themselves. Embodiments protect the user's identity attributes from appearing in plaintext form to any party, such as the relying party, or the identity network, in an interaction. Further, embodiments allow the use of the identity attribute, in encrypted form, to be used to evaluate predicates, which may be necessary to complete interactions. Additionally, embodiments of the invention are convenient to the user, as users are not required to handle their identity attributes.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:

receiving, by a user device from an identity network computer, a query set comprising a plurality of test identity attributes;

encrypting, by the user device, the query set to form an obscured query set;

computing, by the user device, a zero-knowledge proof using the obscured query set and an encrypted identity attribute associated with a user operating the user device; and transmitting, by the user device to the identity network computer, the obscured query set and the zero-knowledge proof, wherein the identity network computer verifies the zero-knowledge proof, retrieves the encrypted identity attribute associated with the user, evaluates the obscured query set with respect to the encrypted identity attribute and determines that the encrypted identity attribute corresponds to a test attribute in the plurality of test identity attributes used to form the obscured query set, and transmits a result of the evaluation to a relying party computer, and wherein the method further comprises:

generating, by the user device, after the user operating the user device responds to a consent request displayed on the user device, a consent token comprising a public key associated with the user device, an opening, and a signature on the query set, signed using a signing key associated with the user device; and transmitting, by the user device to the identity network computer, the consent token.

2. The method of claim 1, wherein the identity network computer generates an authorized token comprising the consent token, and wherein transmitting the result of the evaluation to the relying party computer comprises transmitting the authorized token.

3. The method of claim 1, wherein the user operating the user device responds to the consent request displayed on the user device by authenticating themselves.

4. The method of claim 1, further comprising:

receiving, by the user device from the identity network computer, the consent request, wherein the consent request was transmitted to the identity network computer from the relying party computer, and wherein the consent request comprises a level of access and a time of access that the relying party computer can access the identity attributes of the user.

5. The method of claim 1, wherein the encrypted identity attribute is encrypted with a private key associated with the user device.

6. The method of claim 1, further comprising:

transmitting, by the user device, a user identifier to the relying party computer, wherein the user identifier indicates that the user has an identity account at the identity network computer, and wherein the relying party computer transmits an identity attribute request to the identity network computer comprising the user identifier and the query set.

7. The method of claim 1, wherein after the relying party computer receives the result of the evaluation from the identity network computer, a relying party operating the relying party computer determines whether or not to provide the user access to a resource based upon the result of the evaluation.

8. The method of claim 1, wherein the encrypting, by the user device, the query set to form the obscured query set uses an El-Gamal encryption scheme, and wherein the identity network computer evaluates the obscured query set with respect to the encrypted identity attribute comprises using a decrypt to zero function of an El-Gamal encryption scheme to determine if the identity attribute is a member of the query set.

9. A user device comprising:

a processor; and a non-transitory computer readable medium comprising instructions executable by the processor to perform a method comprising:

receiving, from an identity network computer, a query set comprising a plurality of test identity attributes;

encrypting the query set to form an obscured query set;

computing, a zero-knowledge proof using the obscured query set and an encrypted identity attribute associated with a user operating the user device; and transmitting, to the identity network computer, the obscured query set and the zero-knowledge proof, wherein the identity network computer verifies the zero-knowledge proof, retrieves the encrypted identity attribute associated with the user, evaluates the obscured query set with respect to the encrypted identity attribute and determines that the encrypted identity attribute corresponds to a test attribute in the plurality of test identity attributes used to form the obscured query set, and transmits a result of the evaluation to a relying party computer, and wherein the method further comprises:

generating, by the user device, after the user operating the user device responds to a consent request displayed on the user device, a consent token comprising a public key associated with the user device, an opening, and a signature on the query set, signed using a signing key associated with the user device; and transmitting, by the user device to the identity network computer, the consent token.

10. The user device of claim 9, wherein in the method the encrypted identity attribute is encrypted with a private key associated with the user device.

11. The user device of claim 10, wherein in the method, the identity network computer generates an authorized token comprising the consent token, and wherein transmitting the result of the evaluation to the relying party computer comprises transmitting the authorized token.

12. The user device of claim 10, wherein in the method, the user operating the user device responds to the consent request displayed on the user device by authenticating themselves.

13. The user device of claim 10, wherein the method further comprises: receiving, from the identity network computer, the consent request, wherein the consent request was transmitted to the identity network computer from the relying party computer, and wherein the consent request comprises a level of access and a time of access that the relying party computer can access the identity attributes of the user.

14. A method comprising:

receiving, by an identity network computer from a relying party computer, an identity attribute request comprising a query set comprising a plurality of test identity attributes, and a user identifier;

determining, by the identity network computer, an account associated with the user identifier;

transmitting, by the identity network computer, the query set to a user device of a user, wherein the user device forms an obscured query set from the query set;

receiving, by the identity network computer from the user device, the obscured query set and a zero-knowledge proof;

retrieving, by the identity network computer, an encrypted identity attribute associated with the user;

verifying, by the identity network computer, the zero-knowledge proof;

evaluating, by the identity network computer, the obscured query set with respect to the encrypted identity attribute and determining that the encrypted identity attribute corresponds to a test attribute in the plurality of test identity attributes used to form the obscured query set; and transmitting, by the identity network computer to the relying party computer, a result of the evaluation, wherein the user device is programmed to generate, after the user operating the user device responds to a consent request displayed on the user device, a consent token comprising a public key associated with the user device, an opening, and a signature on the query set, signed using a signing key associated with the user device, and wherein the method further comprises:

receiving, by the identity network computer, the consent token.

15. The method of claim 14, wherein the user identifier is received by the relying party computer from the user device and indicates that the user operating the user device has an identity account at the identity network computer.

16. The method of claim 14, further comprising:

transmitting, by the identity network computer to the relying party computer, the status of the identity account.

17. The method of claim 14, wherein the identity attribute request further comprises the consent request, which comprises comprising a level of access and a time of access that the relying party computer can access the identity attributes of the user.

18. The method of claim 14, wherein the relying party computer is a merchant computer.

19. The method of claim 14, wherein the user device is a mobile phone.

* * * * *